United States Patent [19]

Irvine

[11] Patent Number: 4,470,621
[45] Date of Patent: Sep. 11, 1984

[54] FLEXIBLE TUBULAR CONNECTOR
[75] Inventor: Joseph H. Irvine, Los Angeles, Calif.
[73] Assignee: Hydril Company, Los Angeles, Calif.
[21] Appl. No.: 337,070
[22] Filed: Jan. 4, 1982
[51] Int. Cl.³ .............................................. F16L 55/00
[52] U.S. Cl. .................................... 285/114; 285/149; 285/235
[58] Field of Search ............... 285/223, 235, 149, 114; 138/133, 138; 464/80, 88

[56] References Cited

U.S. PATENT DOCUMENTS

| 471,266 | 3/1892 | Buscher | 285/114 |
|---|---|---|---|
| 2,536,216 | 1/1951 | Powell | 285/114 X |
| 2,606,003 | 8/1952 | McNeill | 255/2 |
| 2,825,364 | 3/1958 | Cullen | 138/56 |
| 3,017,934 | 1/1962 | Rhodes | 175/7 |
| 3,190,315 | 6/1965 | Taylor | 138/127 |
| 3,232,640 | 2/1966 | Donkle | 285/114 X |
| 3,313,345 | 4/1967 | Fischer | 166/0.5 |
| 3,420,276 | 1/1969 | Skinner | 138/127 |
| 3,499,668 | 3/1970 | Cullen | 285/149 |
| 3,501,173 | 3/1970 | Petersen et al. | 285/114 |
| 3,538,238 | 11/1970 | Delacour | 174/47 |
| 3,603,719 | 9/1971 | Lejeune | 174/47 |
| 3,725,167 | 4/1973 | Love | 156/143 |
| 3,886,980 | 6/1975 | Elson | 138/127 |
| 3,933,108 | 1/1976 | Baugh | 114/0.5 D |
| 4,091,843 | 5/1978 | Mikes | 138/127 |
| 4,102,360 | 7/1978 | Hopkins | 138/127 |

FOREIGN PATENT DOCUMENTS

| 2031542 | 4/1980 | United Kingdom | 285/149 |
|---|---|---|---|
| 2032032 | 4/1980 | United Kingdom | 285/235 |

Primary Examiner—Dave W. Arola
Attorney, Agent, or Firm—Dodge & Bush

[57] ABSTRACT

A flexible conductor adapted for use as a "marine riser" in offshore drilling and production operations. The conductor includes a central flexible elastomer portion connected at each end with a rigid tubular portion. Disposed in the elastomer portion are inner and outer reinforcing members for containing the pressure differential across the central portion and for carrying the compressive loads. A plurality of circumferentially spaced longitudinally extending metal wires are disposed in the central portion between the inner and outer reinforcing members for enabling flexing of the central portion while carrying the tension load on the flexible conductor. The longitudinally extending wires are secured to the end portions by threaded retainers for ease of assembly.

4 Claims, 2 Drawing Figures

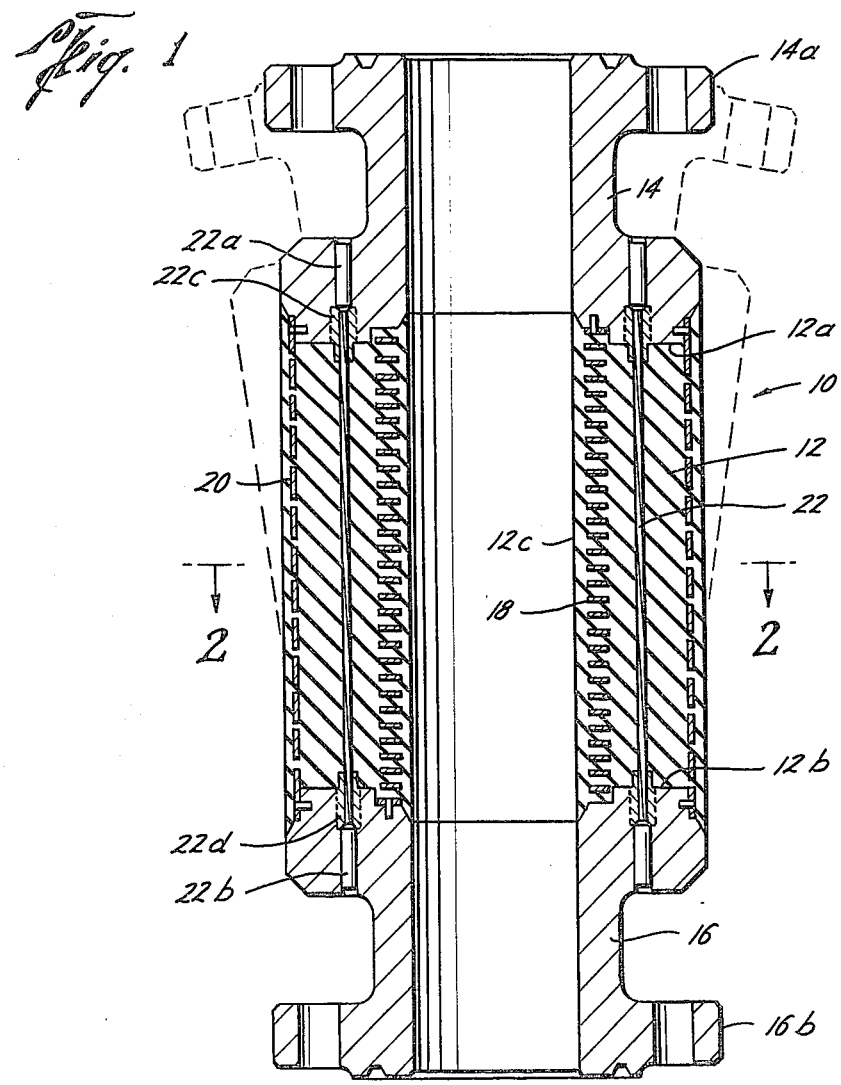

FLEXIBLE TUBULAR CONNECTOR

TECHNICAL FIELD

The present invention relates to the field of flexible tubular conductors for transmitting fluids, and in particular to a flexible tubular connector for use in offshore drilling and production operations from a floating vessel. Tubular conductors used in offshore operations are frequently called "marine risers" and are subjected to a wide range of potentially damaging or destructive forces that must be compensated for in design. As operating depths of "marine risers" increase, the encountered stresses have increased greatly and which has also decreased the design safety factors. To compensate for movement of the floating vessel, marine risers have employed either flexible conductors or ball joints to minimize bending stresses. While the prior solutions have been helpful, they have also established relative limited operating criteria.

BACKGROUND ART

U.S. Pat. No. 2,825,364, to Cullen, et al. is entitled "Flexible Supports for Fluid-Driven Drill Bits." A flexible drilling conduit having a first helically wound wire to resist pull or tension in loading and a second helically wound wire for resisting torque force is disclosed. The second wire is wound at a substantially greater helical angle with respect to the longitudinal axis of the conduit than the first wire, which carries the tension load of the conduit.

U.S. Pat. No. 3,499,668 discloses a similar "Flexible Pipe for Drilling" having adjacent external helically wrapped armor wires which equalize well pressure about the pipes to prevent sticking of the pipe in the well during circulation of the drilling fluid.

Fischer U.S. Pat. No. 3,313,345 discloses a method of tensioning a drilling riser to compensate for environmental forces as well as for the weight of the drilling fluid in the riser. Ball U.S. Pat. No. 3,933,108 contains a similar disclosure, but also recognizes the weight of the riser contributes to undesired compressive loading. The riser is equipped with a plurality of buoyant tanks to ensure the proper tension loading to prevent buckling of the riser. U.S. Pat. No. 3,017,934 also discloses a drilling riser having a plurality of separate buoyant chambers along the length of the riser to maintain the riser under desired tension conditions.

U.S. Pat. No. 2,606,003 to McNeill, entitled "Off-Shore Drilling" discloses an early embodiment of a shallow well drilling from a floating vessel. The riser conductor is provided with either a heavy, large diameter rubber hose flex joints or concentric ball-joint type arrangement to enable flexing to eliminate bending stresses. No particular type of flexible rubber hose construction or the tensioning thereof is disclosed.

U.S. Pat. No. 3,538,238 to Delacour, et al. is entitled "Flexible Guide Pipe for Underwater Drilling." The prior art disclosed therein employs a flexible hose for connecting with the submerged wellhead to provide for return of the drilling fluid. The disclosed flexible guide pipe employs a lower flange connectable with a hydrostatic wellhead connector for securing with the submerged wellhead while an upper flange connects with the mud return line. An outer sleeve or sock formed by a helically wound netting secured to the end flanges limits axial elongation of the flexible guide pipe and carries the tension loading.

The U.S. patent to Taylor, No. 3,190,315, discloses a typical high pressure hose having an inner tubular member of elastomer material impervious to fluid passing therethrough. The inner tubular member is surrounded by reinforcing layers of braided construction which is in turn surrounded by an insulating layer also of elastomer material. Surrounding the insulation layer is a second helical round reinforcement layer that is covered by the outer cover. Both reinforcing layers are helically wound and no special tension carrying elements are disclosed.

U.S. Pat. No. 3,725,167 to Love, et al. discloses a hose having multi-layers of helically wrapped braided reinforcement. See also U.S. Pat. Nos. 3,420,276 to Skinner, et al. and 3,603,719 to LeJeune, as well as U.S. Pat. No. 3,886,980 to Elson.

U.S. Pat. No. 4,091,843, entitled "Flexible Tubes for Hydraulic Application" discloses a tubing that is particularly useful in hydraulic systems using a non-combustible liquid.

U.S. Pat. No. 4,102,360 to Hopkins discloses a flexible hose having a plurality of braided layers that are vulcanized to form a unitary structure.

SUMMARY OF THE INVENTION

The present invention relates broadly to the field of flexible tubular conduits and specifically to flexible conduits usable as marine risers.

Flexible conductors are desirable as marine risers as they lack relative motion between adjoining components such as ball and socket connections. Such relative motion necessitates the use of seals and sealing surfaces which are subject to failure and must be repaired or replaced when scored or worn. Despite not having those sealing surfaces or wear surface to deteriorate, flexible risers have not received widespread acceptance. This lack of acceptance is due at least in part to the limited ability of prior flexible risers to carry the tension loads required to prevent buckling of marine riser systems.

The tubular conduit of the present invention includes a central flexible tubular portion secured at a first end to a first substantially rigid tubular end portion and at a second end to a second substantially rigid tubular end portion. The central flexible tubular portion is formed of an elastomer material having an inner reinforcing member and an outer reinforcing member for holding the pressure differential across the central portion of the tubular conduit, and also for supporting longitudinal compressive loads. A plurality of circumferentially spaced longitudinally extending wires disposed between the inner and outer reinforcing members carry the external tension loading which is all bonded together to form a unitary structure. For ease of assembly, the longitudinal cables or wires are held by adjustable retainers. The tubular end portions are provided with suitable end connectors as desired for operably connecting with adjacent tubular conduits and the like which may or may not be flexible.

BRIEF DESCRIPTION OF THE DRAWINGS

FIG. 1 is a side view, in section, of the flexible tubular conduit of the present invention; and FIG. 2 is a view taken along lines 2—2 of FIG. 1.

DESCRIPTION OF THE PREFERRED EMBODIMENT

The flexible conductor of the present invention, generally designated 10, is illustrated in the Figs. and includes a flexible central elastomer tubular portion 12. The central portion 12 has a first end 12a which is secured to a substantially rigid upper or first tubular end portion 14. A second or lower end portion 12b is secured to a lower or second substantially rigid tubular end portion 16. The central tubular portion 12 includes a bore defining inner surface 12c for forming a flow passage for containing the flowing fluid under pressure. The central portion 12 also substantially forms the longitudinal central axis of the flexible conductor 10.

The first or upper substantially rigid tubular end portion 14 includes a flange 14a for connecting with the adjacent flow conductor which may be either rigid or flexible. The flange 14a may be of the raised face type or may be of the ring joint type with grooves such as illustrated in FIG. 1. Other suitable end connections may be used such as the helical threads disclosed in Blose U.S. Pat. No. 4,192,533 issued Mar. 11, 1980 which is hereby incorporated by this reference as if set forth fully herein. The second end portion 16 may be provided with a companion flange 16b for connection in a similar manner.

Bonded in the central elastomer portion 12 is an inner reinforcing member 18 which is secured at opposite ends with the end portions 14 and 16 in the usual manner. An outer reinforcing member 20 is also secured at its opposite ends with end portions 14 and 16. The spaced apart inner and outer reinforcing members 18 and 20 assist in holding the pressure differential across the central portion 12 which would tend to either collapse the center elastomer portion 12 or if a greater internal pressure that would tend to burst the central elastomer portion 12. Reinforcing members 18 and 20 also support the longitudinal compressive loads.

Disposed between the inner and outer reinforcing members 18 and 20 are a plurality of equi-circumferentially spaced longitudinally extending metal support wires 22 for carrying the tension loading of the conductor 10 while enabling flexing thereof. Wire retainers 22a and 22b grippingly engage each of the metal wires 22 for securing with the first tubular end portion 14 and the second tubular end portion 16, respectively. The adjustable threaded retainers 22c and 22d are preferably used for ease of assembly of the flexible conductor 10.

Preferably, the longitudinally extending wires 22 and the reinforcing members 18 and 20 are bonded in the elastomer central portion 12 to form a unitary structure which is secured to the tubular end portions 14 and 16.

The use of the longitudinally extending wires 22 for carrying tension loading tends to reduce the necking down or reduction in the diameter of the inner surface 12c of the central portion 12 which results when the reinforcing members 18 and 20 are subjected to tension loading. In the case of a marine riser, the inside bore dimensions 12c may be critical and by necking down the central flexible portion 12c insufficient clearance may result to pass desired well tools. The longitudinal wires 22 enable the flexing movement of the flexible conduit between the non-flexed condition illustrated in FIG. 1 and the flexing conditions illustrated therein in phantom. This flexing movement eliminates the need for a ball and socket connection in a marine riser with the possibility of leakage and scoring damage thereto. In addition, the flexible connector 10 eliminates transmission of bending stresses to the rigid conductors of the marine riser which would tend to collapse those conductors. If sufficient angular misalignment between the floating drilling ship and the wellhead is not provided by a single flexible conductor, a plurality of flexible conductors may be employed to achieve the desired angular flexure.

Operation

In the use and operation of the present invention, the flexible conductor 10 is assembled in the manner illustrated. The conductor 10 is then secured in the marine riser (not illustrated) at a desired location for flexing. Preferably this location is immediately above the submerged wellhead, but the flexible conduit may be utilized elsewhere in the riser system. As the drilling vessel moves relative to the wellhead, the conductor 10 will flex the central portion 12 for compensating for the misalignment thereof. The tension forces on the marine riser which are required to prevent buckling of the marine riser are carried by the longitudinally extending wires 22 which does not result in the bore 12c being reduced in diameter by tension loads being carried by the reinforcing members 18 and 20 of the flexible central portion 12.

A flexible conductor is utilized that, unlike a high pressure flexible hose, not only withstands internal pressure but also external pressure, and mostly both tensile and compressive loads.

The foregoing disclosure and description of the invention are illustrative and explanatory thereof, and various changes in the size, shape and materials, as well as in the details of the illustrated construction, may be made without departing from the spirit of the invention.

I claim:

1. A flexible conductor adapted for use as a marine riser in floating offshore well drilling operations, including:

a central elongated flexible tubular portion formed of an elastomer material for forming a flow passage and having an inner helical ring reinforcing member and an outer helical ring reinforcing member for holding pressure differential across said central tubular portion to prevent necking down of the inside dimension of said flow passage to maintain suitable clearance to enable passage of desired well tools through said flow passage and for supporting longitudinal compressive loads, said central tubular portion defining a longitudinal axis of said conductor;

said central flexible tubular portion having a first end secured to a first substantially rigid tubular end portion and at a second end to a second substantially rigid tubular end portion;

said first end portion and said second end portion each having means for connecting said flexible conductor with the adjacent flow conductor for forming a portion of a flow conduit; and a plurality of circumferentially spaced longitudinally extending metal wires secured to said first tubular end portion and said second tubular end portion for carrying the tension loading on said flexible conductor, each of said plurality of longitudinal extending spaced metal wires is bonded in said elastomer material disposed between said inner reinforcing members and said outer reinforcing member to form a unitary structure, said metal wires enabling flexing movement of said central tubular portion to compensate for any changes in alignment of the adjacent flow conductors of the flow conduit.

2. The flexible conductor as set forth in claim 1, wherein:

said means for connecting said flexible conductors with the adjacent flow conductor includes a flange.

3. The flexible conductor as set forth in claim 1, wherein:

each of said plurality of longitudinally extending spaced metal wires having threaded cable retainers secured to said end portions for ease of assembly of the flexible conductor.

4. The flexible conductor as set forth in claim 1, wherein:

said plurality of longitudinally extending spaced metal wires are equi-circumferentially spaced about the longitudinal axis of said conductor.

* * * * *